(12) United States Patent
Miyamae (10) Patent No.: US 7,628,547 B2
(45) Date of Patent: Dec. 8, 2009

(54) OPTICAL MODULE AND OPTICAL COMMUNICATIONS DEVICE

(75) Inventor: Akira Miyamae, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 11/955,906

(22) Filed: Dec. 13, 2007

(65) Prior Publication Data
US 2008/0144032 A1 Jun. 19, 2008

(30) Foreign Application Priority Data
Dec. 18, 2006 (JP) ............................. 2006-339783

(51) Int. Cl.
*G02B 6/36* (2006.01)
*G02F 1/295* (2006.01)

(52) U.S. Cl. .................. 385/92; 385/4; 385/5; 385/88; 385/93; 385/94

(58) Field of Classification Search .............. 385/4, 385/5, 88, 92, 93, 94
See application file for complete search history.

(56) References Cited

U.S. PATENT DOCUMENTS 7,410,305 B2 * 8/2008 Ohe et al. ...................... 385/88
7,439,533 B2 * 10/2008 Kito et al. ..................... 250/552

FOREIGN PATENT DOCUMENTS

| JP | A 8-236807 | 9/1996 |
|---|---|---|
| JP | A 10-65189 | 3/1998 |
| JP | A 2004-72072 | 3/2004 |

* cited by examiner

*Primary Examiner*—Ryan Lepisto
(74) *Attorney, Agent, or Firm*—Oliff & Berridge, PLC (57) ABSTRACT

An optical module includes: a light source; a variable transmissivity member that is disposed on a light path of light emitted from the light source with a spacing from the light source, the variable transmissivity member having transmissivity that increases as temperature rises; and an optical fiber that receives light that has been transmitted through the variable transmissivity member.

7 Claims, 5 Drawing Sheets

OPTICAL MODULE AND OPTICAL COMMUNICATIONS DEVICE

The entire disclosure of Japanese Patent Application No. 2006-339783, filed Dec. 18, 2006 is expressly incorporated by reference herein.

BACKGROUND

1. Technical Field

The present invention relates to an optical module and an optical communications device used for optical communication.

2. Related Art

There are optical modules of various forms. One known example is an optical module of a structure in which a monitoring light receiving element receives part of light emitted from a light emitting element to monitor the quantity of the light. In this case, the quantity of the light emitted sometimes varies with the ambient temperature. Thus, related art technology has aimed at minimizing the temperature characteristic of each member, such as a monitoring light receiving element or a lens, in order that a proportionality relation may be maintained between a monitored quantity of light and a fiber coupled quantity of light, regardless of the ambient temperature.

JP-A-2004-72072 and JP-A-10-65189 are examples of related art.

Furthermore, JP-A-8-236807 discloses a technique that uses a multilayer transparent film (27) having transmissivity that shows a low value at a wavelength, at which the emission intensity is high, of light emitted from a luminous layer (24), thereby reducing temperature-caused variation in the output of light.

The inventors has examined a way to keep the quantity of light emitted from a light emitting element constant by feedback controlling the driving current off the light emitting element on the basis of the quantity of light received by an optical module (a module for optical communication). In the case where a vertical cavity surface emitting laser (VCSEL) is used as the light emitting element, feed back control (Auto Power Control (APC)) is particularly important to keep the quantity of light constant because, in this case, significant variation occurs in the quantity of light with changes in the ambient temperature, decreasing the quantity of the emitted light as the temperature rises.

In the case of an optical module with a band of 850 nm or more, on the other hand, it is necessary to increase the driving current in order to permit a high speed drive even at a low temperature. This is because of a phenomenon that the drive bandwidth of an element decreases where the driving current diminishes due to a low temperature. The output of light increases in this case. Therefore, a partial reflection film is used to attenuate the quantity of light (attenuation) and secure the safety of human eyes, and other things.

However, if the driving current of the above described light emitting element is feedback controlled based on the attenuated light, the driving current will become even larger at a high temperature. As a result, the driving current may transcend its limit value (the upper limit), becoming unable to operate, because of a shortage of output, at a temperature of a certain degree or higher. In contrast, if the element is operated with a constant driving current, the operating temperature limit may become wider, but variation in the quantity of light will increase, as described above.

In addition, in the case of a laser beam, there is a value of current for each degree of temperature, which value permits the laser beam to emit light most efficiently. Therefore, use of a driving current of such value will make the operating temperature limit wider and, furthermore, improve the transmission characteristics including, for examples the speed of operation and reduction of noise.

SUMMARY

An advantage of the invention is to reduce temperature-caused variation in the output of light in an optical module. It is another advantage to widen the temperature limit that allows driving of an optical module. It is still another advantage to improve the characteristics of an optical module.

An optical module according to a first aspect of the invention includes: a light source; a variable transmissivity member that is disposed on a light path of light emitted from the light source with some spacing from the light source, the variable transmissivity member being improved in transmissivity as temperature rises; and an optical fiber that receives light that has been transmitted through the variable transmissivity member.

The structure allows reduction of an impact from temperature-caused variation in the light emitted.

In the optical module, for example, a wavelength of the emitted light may increase as temperature rises. The increasing the wavelength of the emitted light, thus accompanying rise of temperature, can be used to reduce variation in the quantity of the emitted light that has been transmitted through the variable transmissivity member.

In the optical module, for example, the light source may be a vertical cavity surface emitting laser (VCSEL). Even if such laser is used, the laser having significant temperature-caused variation in the quantity of light emitted, the structure allows reduction of an impact from the temperature-caused variation.

In the optical module, for example, transmissivity of the variable transmissivity member may vary according to variation in the wavelength of incident light. The structure allows reduction of variation in the quantity of light emitted because the emitted light, in which the wavelength varies with rise of the temperature, is transmitted through the variable transmissivity member.

In the optical module, for example, transmissivity of the variable transmissivity member may be enhanced as the wavelength of the incident light increases. The structure allows reduction of variation in the quantity of the emitted light because the emitted light, whose wavelength increases with rise of the temperature, is transmitted through the variable transmissivity member.

In the optical module, for example, the optical module may have a branching member that is disposed on the light path and branches part of the light that has been transmitted through the variable transmissivity member, and a light quantity monitor that detects the quantity of light branched by the branching member, in order to control the quantity of light emitted from the light source according to the quantity of branched light. The structure allows reduction of temperature-caused variation in the quantity of the emitted light even in the case where the above described control is performed. Furthermore, the light quantity monitor permits prevention of increase in the driving current because the light quantity monitor monitors the branched light that has been transmitted through the variable transmissivity member. Consequently, the structure allows a wider operating temperature limit for the optical module.

In the module, for example, the branched light may be received by the light quantity monitor without having been transmitted through the variable transmissivity member. The structure facilitates designing of the variable transmissivity member because monitoring is performed on a branched light that has been transmitted once through the variable transmissivity member.

Meanwhile, the optical fiber is a light receiving section that receives light transmitted through the variable transmissivity member. The optical fiber externally transmits light received by the light receiving section in the form of a signal.

An optical module according to a second aspect of the invention includes: a light source; a variable transmissivity member that is disposed on a light path of light emitted from the light source with a spacing of a first distance from the light source, the variable transmissivity member having transmissivity that increases as temperature rises; a partial reflection member that is disposed on the light path of the light emitted from the light source with a spacing of a second distance from the light source, the second distance being larger than the first distance, and reflects a first light component and transmits a second light component of the light that has been transmitted through the variable transmissivity member; an optical fiber that receives the second light component; and a light quantity monitor that is disposed on a light path of the first light component. In the optical module, the variable transmissivity member is disposed in such a manner that the light path of the emitted light and the light path of the first light component pass through, and the light quantity monitor detects the quantity of the first light component that has been transmitted through the variable transmissivity member.

The structure allows reduction of the impact from temperature-caused variation in the emitted light. The structure also allows the light quantity monitor to reduce the impact from temperature-caused variation in the quantity of the emitted light. Thus, the structure makes the operating temperature limit of the optical module wider. In addition, monitoring of a branched light that has been transmitted twice through the variable transmissivity member will eliminate restriction on the region where the variable transmissivity member is formed. This facilitates manufacture of the optical module.

In the optical module, for example, a wavelength of the emitted light may increases as temperature rises. Utilization of the increasing the wavelength of the emitted light, the increase having been thus caused by rise of the temperature, permits reduction of variation in the quantity of the emitted light that is transmitted through the variable transmissivity member.

In the optical module, for example, the light source may be a vertical cavity surface emitting laser (VCSEL). The structure allows reduction of the impact from temperature-caused variation in the emitted light even in the case where such laser producing significant temperature-caused variation in the quantity of light is used.

In the optical module, for example, the variable transmissivity member may have a transmissivity that varies with variation in the wavelength of the incident light. The structure allows reduction of variation in the quantity of light transmitted if the emitted light, in which the wavelength varies with rise in the temperature, is transmitted through the variable transmissivity member.

In the optical module, for example, transmissivity of the variable transmissivity member may be lower than transmissivity of the partial reflection member at a certain temperature. The structure allows reduction of variation in the quantity of the emitted light that is transmitted through the variable transmissivity member and the partial reflection film. The structure also allows a more accurate monitoring of the branched light that has been transmitted twice through the variable transmissivity member.

In the optical module, for example, a first temperature inclination representing the transmissivity variation with respect to the temperature variation in the partial reflection member, may be smaller than a second temperature inclination representing the transmissivity variation with respect to the temperature variation in the variable transmissivity member. The structure permits reduction of variation in the quantity of the emitted light that is transmitted through the variable transmissivity member and the partial reflection member. It also allows a more accurate monitoring of the branched light that has been transmitted twice through the variable transmissivity member.

An optical communications device according to a third aspect of the invention includes the optical module. This improves the characteristics of the optical communications device.

BRIEF DESCRIPTION OF THE DRAWINGS

The invention will be described with reference to the accompanying drawings, wherein like numbers reference like elements.

EXEMPLARY EMBODIMENTS OF THE INVENTION

Embodiments of the invention will be described.

First Embodiment

Referring to FIGS. 1 through 6, a first embodiment of the invention will now be described.

Figure 1:
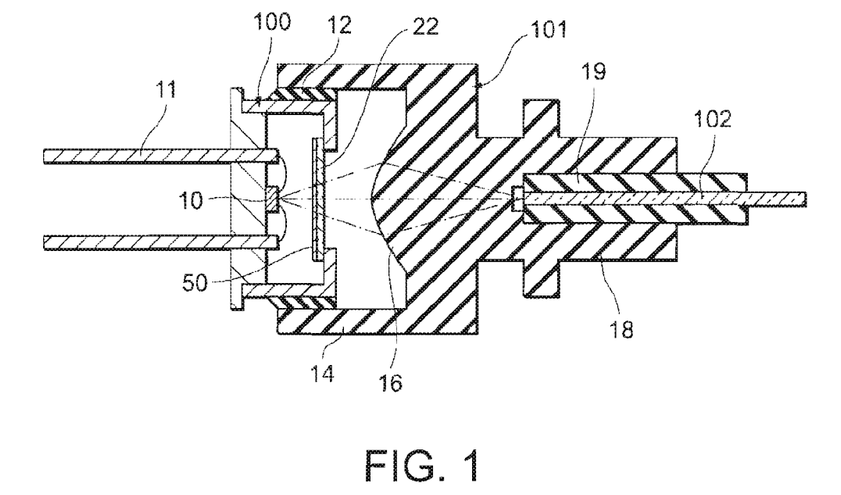
FIG. 1 is a sectional view that shows structure of an optical module according to a first embodiment of the invention.

FIG. 1 is a sectional view showing the structure of an optical module (an optical transmission module, an optical transmission device, a light emitting module or an optical transmitter) according to the present embodiment. The optical module includes a CAN package (CAN) 100 and a connector 101 that are set in mutually adjusted positions and fixed by means of an adhesive 12. The connector 101 supports one end of an optical fiber 102 and optically couples the optical fiber 102 to a light emitting element (light source) 10 inside the CAN 100.

The CAN 100 includes a light emitting element 10 that is packaged in all enclosure made of a material such as a metal. In the present embodiment, a vertical cavity surface emitting laser diode (VCSEL), emitting light in multiple modes, is employed as the light emitting element 10. The wavelength of light outputted from the light emitting element 10 is 850 nm, for example. The light emitting element 10 is coupled by a lead wire 11 and a wire, or the like, to be driven by way of the lead wire 11. Furthermore, the CAN 100 includes a glass plate 22 that is disposed with some spacing from the light emitting element 10. The glass plate 22 is disposed between the light emitting element 10 and a lens 16, namely on the light path (light axis) of light outputted from the light emitting element 10. In the present embodiment, the glass plate 22 is disposed in such a way that one face (surface) thereof is orthogonal to the light axis.

The connector 101 includes a supporting portion 14 that has a shape of a cavity and supports the CAN 100, a lens 16 and a sleeve portion 18 where one end of the optical fiber 102 is fit in, thus being supported by the sleeve portion. The lens 16 is disposed on the light path of light outputted from the light emitting element 10, collects the light outputted from the light emitting element 10 and leads the collected light to the one end (light-receiving part, joint part) of the optical fiber 102. These portions are cast by; for example, resin treatment. Needless to say, the connector 101 may also be formed through joining of separate parts using, for example, an adhesive.

A ferrule 19 is fixed on the one end of the optical fiber 102, the ferrule being inserted into the sleeve portion 18. The optical fiber 102 is a graded index (GI) multimode fiber with for example, a core diameter of 50 μm, a clad diameter of 125 μm and NA of 0.21.

The present embodiment has a feature that it includes a wavelength filter (filter) 50 that is disposed on the surface of a semi-transparent glass 22. Transmissivity of the wavelength filter 50 varies with variation in the wavelength of the incident (inputted) light. Specifically, the wavelength filter 50 is a variable transmissivity member in which the transmissivity increases as the wavelength grows in the incident light. Here, the wavelength filter 50 is made to have an attenuation effect through its own transmissivity efficiency that is set low to some extent. Consequently, there is no more need to provide a partial reflection film that has so far been required. Needless to say, the partial reflection film may be employed together to enhance the degree of attenuation. The partial reflection film is made with a metal film, or the like, that is coated on the surface or the rear surface of the glass plate 22.

As such, the present embodiment allows reduction of thermal variation in the light outputted from the CAN 100 (the light transmitted through the wavelength filter 50), because here the above described wavelength filter 50 is disposed on the light path of light outputted from the light emitting element 10.

Figure 2:
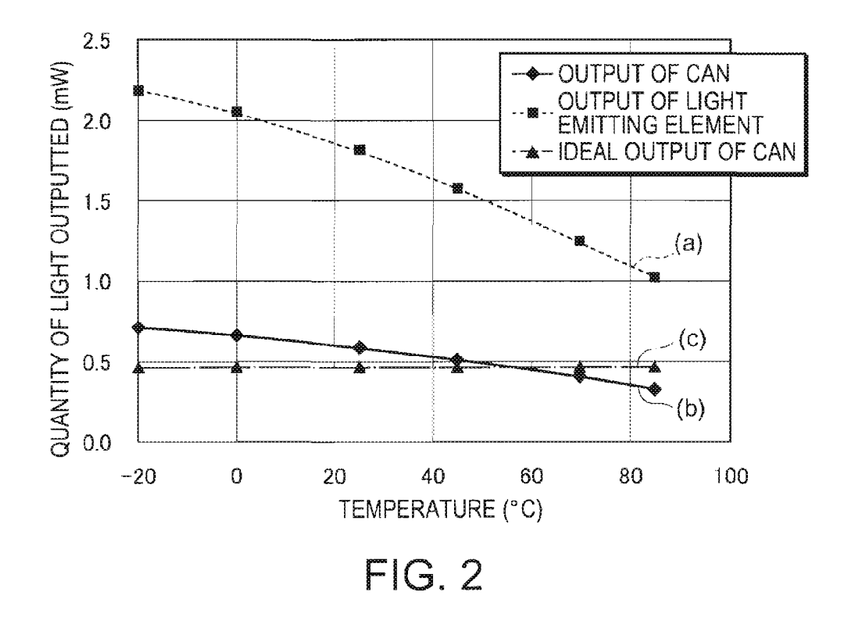
FIG. 2 is a diagram (a graph) that shows temperature characteristic of quantity of light outputted from a CAN package in a case where a light emitting element and a wavelength filter are not used.
Figure 3:
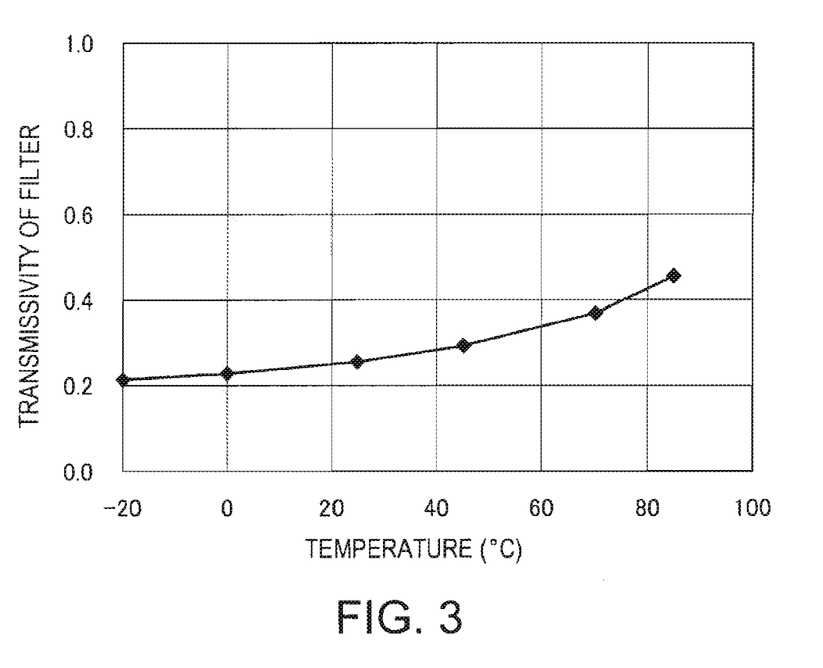
FIG. 3 is a diagram that shows temperature characteristic of transmissivity of a wavelength filter.
Figure 4:
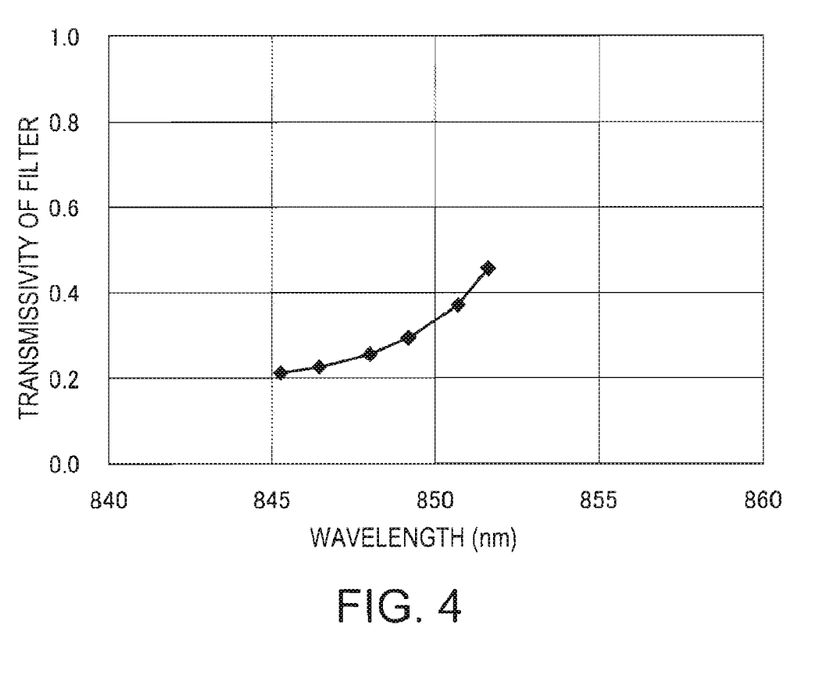
FIG. 4 is a diagram that shows wavelength characteristic of transmissivity of a wavelength filter.

Now, referring to FIGS. 2 through 4, the effects to be obtained by the embodiment will be described in more detail. FIG. 2 is a diagram that shows temperature characteristic of the quantity of light outputted from the CAN 100 in the case where the light emitting element 10 and the wavelength filter 50 are not used. The axis of ordinate represents the quantity of light outputted (in mW) and the axis of abscissas represents the temperature (in ° C.). FIG. 3 is a diagram that shows the temperature characteristic of the transmissivity of the wavelength filter 50. The axis of ordinate represents the transmissivity and the axis of abscissas represents the temperature (in ° C.). FIG. 4 is a diagram that shows the wavelength characteristic of the transmissivity of the wavelength filter 50. The axis of ordinate represents the transmissivity and the axis of abscissas represents the wavelength (in nm).

As shown by graph (a) in FIG. 2, the output of the light emitting element (VCSEL) 10 deteriorates as the temperature (ambient temperature, operating temperature) rises. Accordingly, the output of the CAN 100 also deteriorates with the rise in the temperature (graph (b)). To give an example, where the temperature is 25° C., the output of the VCSEL is 1.81 mW while the output of the CAN is 0.46 mW The driving current of the light emitting element 10, meanwhile, is kept constant. In addition, graph (c) in FIG. 2 shows an ideal output of the CAN 100.

Therefore, if the wavelength filter 50 is designed so as to have a transmissivity having temperature characteristic such as is shown in FIG. 3, deterioration in the output of light from the light emitting element 10 can be offset by increase in the transmissivity of the wavelength filter 50.

On the other hand, the output from the light emitting element 10 has a characteristic to shift toward having a longer wavelength as the temperature rises. In other words, the output from the light emitting element 10 grows in the wavelength (oscillation wavelength) as the temperature rises. For example, to give the case of one VCSEL, the wavelength is 848 nm at 25° C. and it grows by 0.06 nm each time the temperature rises by 1° C. That is, the temperature shift coefficient of the wavelength is 0.06 nm/° C. in the VCSEL.

Thus, it has been decided by the inventors of the invention that a material (wavelength filter) having the wavelength characteristic of transmissivity shown in FIG. 4 be designed and be used as the above described wavelength filter 50, in order to control variation in the temperature output of the CAN 100.

Namely, since the output from the light emitting element 10 shifts toward having a longer wavelength as the temperature rises, the wavelength filter 50 is designed in such a way that its transmissivity increases as the wavelength grows.

This type of wavelength filter 50 may be made, for example, of a dielectric multilayer film. Lamination of dielectric layers having a variety of properties allows the transmissivity to vary in tandem with variation in the wavelength of the incident light.

Figure 5:
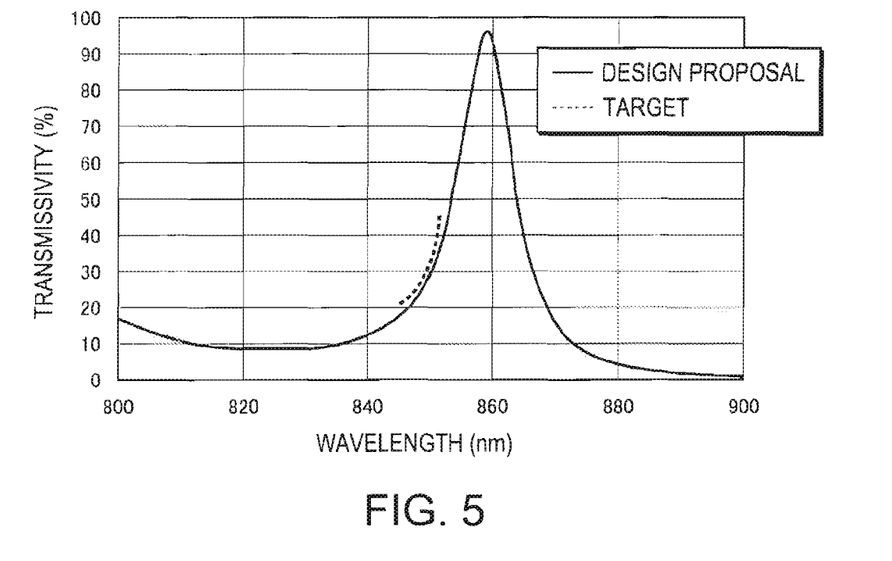
FIG. 5 is a diagram that shows characteristics of a wavelength filter that is designed to reproduce the wavelength characteristic of transmissivity shown in FIG. 4.

In designing this type of wavelength filter 50, fine control (designing, simulation) of the wavelength characteristic of transmissivity is already established as the designing method for a wavelength filter. Details of this design technique is described, for example, in "Optical Thin Film and Coating Technologies" written by Cheng Chung Lee and published by the Agne Gijutsu Center as well as "Optical Designing and Good Use of a Simulation Software Revised Edition" edited by the editorial department of the Optronics Co., Ltd. For example, FIG. 5 shows the characteristics of a wavelength filter that is designed to reproduce the wavelength characteristic of transmissivity shown in FIG. 4L. The continuous line represents the design proposal (simulation result) and the broken line represents the target portion.

As described above, the present embodiment allows control of variation in the output of the CAN 100 because the above described wavelength filter 50 is disposed on the light path of the light emitting element 10. Thus, the embodiment allows improvement in the characteristics of an optical module.

Second Embodiment

Figure 6:
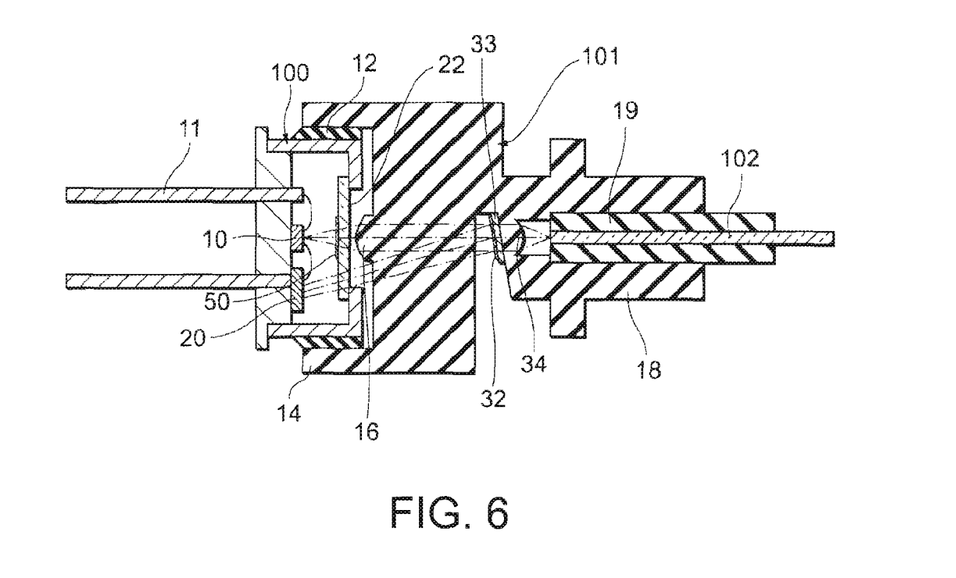
FIG. 6 is a sectional view that shows structure of an optical module according to a second embodiment of the invention.

Referring to FIG. 6, a second embodiment of the invention will now be described. In the present embodiment, a monitoring light receiving element (a light quantity monitor) 20 is provided to feedback control (APC) the driving current in the light emitting element 10.

FIG. 6 is a sectional view showing the structure of an optical module according to the present embodiment. The optical module includes the CAN 100 and the connector 101, in the same way as in the first embodiment.

In the present embodiment, the CAN 100 includes a monitoring light receiving element 20 to provide a structure to monitor the output of light from the light emitting element 10. The monitoring light receiving element 20 is coupled to the lead wire 11 and furthers by way of a wire, to the light emitting element 10.

Furthermore, the connector 101 includes a partial reflection film (branching member partial reflection member) 32 and a lens (a second lens) 34. These parts are disposed on the light path of the light outputted from the light emitting element 10. In other words, they are disposed between the lens (the first lens) 16 and the optical fiber 102. Distance between the light emitting element 10 and the partial reflection film 32 is D2, the distance D2 being larger than the distance D1 between the light emitting element 10 and the wavelength filter 50. Furthermore, the partial reflection film 32 is disposed in such a manner that one face thereof is inclined (i.e. not orthogonal) with respect to the light path of the output light from the light emitting element 10. The partial reflection film 32 is made of a very thin dielectric thin film that provides coating to the surface of a glass plate 33 and reflects a partial component (a first light) of the output light from the light emitting element 10, the output light having been quasi collimated by the lens 16. The portion reflected is about 10%, for example, of the output light. The other component (the second light) is transmitted through the partial reflection film 32.

It is preferable that the partial reflection film 32 be designed in such a manner that the ratio between the transmitted portion and the reflected portion does not vary by the wavelength or the temperature of the input light. That means, it is preferable that the film reflect a constant proportion of the input light; regardless of the wavelength or the temperature of the input light.

In the present embodiment, the partial reflection film (the glass plate 33) 32 is disposed on the inclined surface that intersects the output light from the light emitting element 10. The inclined surface can be made, for example, by cutting out the resin member that forms the connector 101. Meanwhile, it is also allowed that the inclined surface is directly coated with the above described dielectric thin film. It is also allowed to omit the lens 34.

In the present embodiment, the output light from the light emitting element 10 is reflected (branched) here by the partial reflection film 32. The monitoring light receiving element 20 is disposed so that it is allowed to receive the reflected light (the branched light, the first light) generated by the partial reflection film 32 in order to produce a current (hereinafter referred to as the "monitoring current") that corresponds to the quantity of light received (the quantity of reflected light). The monitoring light receiving element 20 is made of a semiconductor element such as a photo diode or a photo transistor. Consequently, the quantity of light received by the monitoring light receiving element 20 varies in response to variation in the light outputted, thereby permitting adjustment of the monitoring current. The quantity of light outputted from the light emitting element 10 can be controlled in the above described manner.

In the present embodiment, furthermore, the wavelength filter 50 is formed not over the entire surface of the glass plate 22 but only on a portion of the glass plate, the portion corresponding to the light path of light outputted from the light emitting element 10. Accordingly, the above described reflected light is inputted to the monitoring light receiving element 20 without being transmitted (without passing) through the wavelength filter 50. In other words, the monitoring light receiving element 20 receives light that; has been transmitted through the wavelength filter 50 only once.

Because of the above described wavelength filter 50 that is disposed on the light path of the output light from the light emitting element 10, the present embodiment allows reduction of temperature variation in the output light of the CAN 100 (light that has been transmitted through the wavelength filter 50), in the same way as in the first embodiment.

Moreover, the feed back control (APC) performed by the monitoring light receiving element 20 allows an even more uniform output of light from the light emitting element 10. The APC also permits adjustment of the output light even in the case where the output light from the light emitting element 10 is changed by a condition other than a change in the temperature. It also permits the output light to be adjusted even if there is a departure in characteristics of the wavelength filter 50 from their initial design values, the departure having resulted from the production tolerance, for example.

In addition, the operating temperature limit for an optical module is wider in the present embodiment. The effects are as follows. As has been described in the first embodiment with reference to FIG. 2, the output from the light emitting element (VCSEL) 10 deteriorates as the temperature rises (see graph (a) in FIG. 2). Therefore, the output from the CAN 100 also deteriorates in response (see graph (b) in FIG. 2). However, feed back control performed by the monitoring light receiving element 20 will improve uniformity in the output from the CAN 100, thereby rendering the output closer to the ideal output from the CAN 10, as shown by graph (c) in FIG. 2.

However, an upper limit is set for the driving current (monitoring current) in order to prevent the output of light from growing too large. Therefore, it is not allowed to drive the light emitting element 10 to such an extent that the upper limit is transcended. As a result, the optical module is no more available at a temperature that causes the driving current to transcend its upper limit. Meanwhile, the upper limit is appropriately set for each apparatus.

In contrast, the present embodiment permits a lower degree of adjustment by the driving current (monitoring current) of the light emitting element 10 because the embodiment uses the wavelength filter 50 to reduce temperature variation in the light outputted from the CAN 100. In other words, the driving current need not be increased to a large extent. This allows increase in the operating temperature limit of an optical module. The embodiment also allows the monitoring accuracy to be enhanced because the light monitored is the reflected light that has been transmitted through the wavelength filter 50.

Third Embodiment

Figure 7:
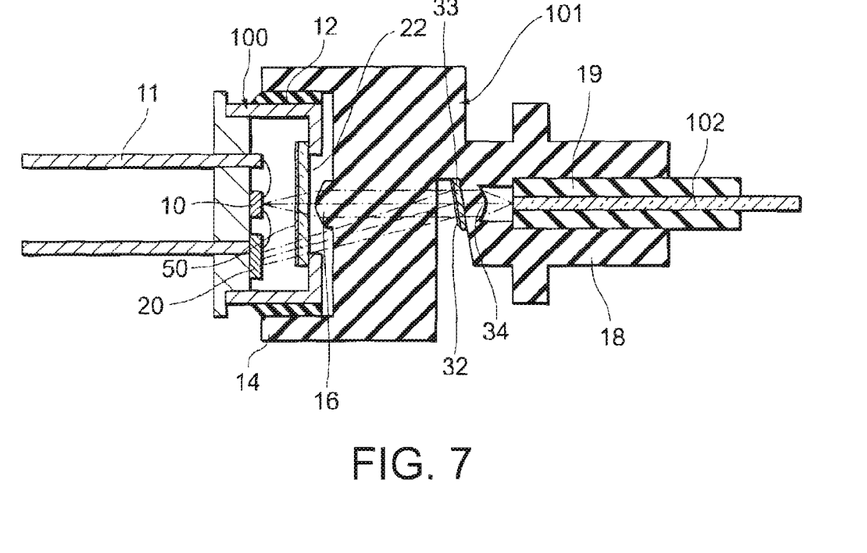
FIG. 7 is a sectional view that shows a structure of an optical module according to a third embodiment of the invention.
Figure 8:
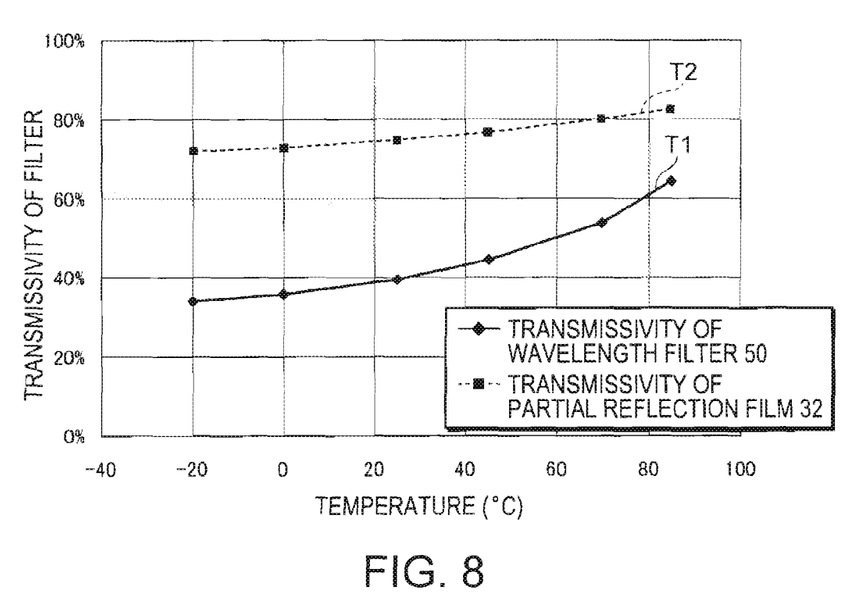
FIG. 8 is a diagram that shows temperature characteristic of transmissivity (T1, T2) in the wavelength filter and a partial reflection film.
Figure 9:
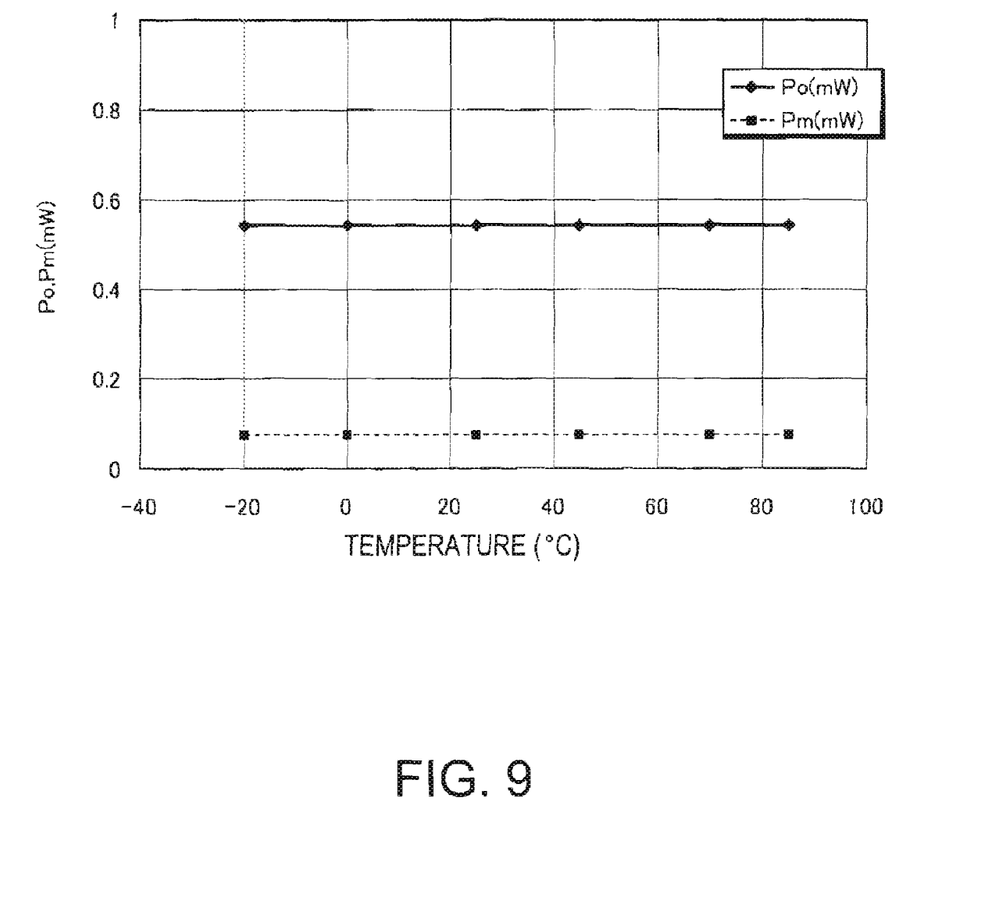
FIG. 9 is a diagram that shows temperature characteristic of Po and Pm in a case where a wavelength filter has the temperature characteristic shown in FIG. 8.

Referring to FIGS. 7 through 9, a third embodiment of the invention will now be described.

In contrast to the second embodiment, the wavelength filter 50 is formed over the entire surface of the glass plate 22 in the present embodiment, as shown in FIG. 7. This facilitates the process to form the wavelength filter 50. Specifically, masking and etching are rendered unnecessary here. Furthermore, it is no more required to mutually adjust the positions of the light emitting element 10 and the wavelength filter 50. On the other hand, the present embodiment does not require any other modification to be made to the contents of the second embodiment than the modification of the above described region in which the wavelength filter 60 is to be formed.

Here, however, the monitoring light receiving element 20 receives light that has twice been transmitted through the wavelength filter 50, as shown in FIG. 7.

Thus, in the present embodiment, the wavelength characteristic has been adjusted in the wavelength filter 50 and the partial reflection film 32, based on the following expressions (i) and (ii).

Assuming that the quantity of light outputted from the light emitting element 10 is Pv, light inputted to the optical fiber 102 is Po, light inputted to the monitoring light receiving element 20 is Pm, transmissivity of the wavelength filter 50 is T1, and transmissivity of the partial reflection film 32 is T2, the following expressions are established: (i) Po=Pv×T1×T2; and (ii) Pm=Pv×T1×(1−T2)×T1. In the expressions, T1 and T2 are to be obtained so as to keep Po and Pm constant even if Pv varies with the temperature.

FIG. 8 shows the temperature characteristic of the transmissivity (T1, T2) of the wavelength filter 50 and the partial reflection film 32, as obtained from the above described expressions. The axis of ordinate represents the transmissivity (%) while the axis of abscissas represents the temperature (%). In the present embodiment, T1 and T2 have been obtained on the assumption that the quantity of light outputted (Pv) is 0.54 mV and the light inputted (Pm) to the monitoring light receiving element 20 is 0.072 mW. Consequently, if wavelength filters having the temperature characteristic shown in FIG. 8 are used as the wavelength filter 50 and the partial reflection film 32, temperature variation in the light outputted from the CAN 100 can be reduced. As observed from FIG. 8, the transmissivity (T2) of the partial reflection film 32 is larger than the transmissivity (T1) of the wavelength filter 50 at a certain temperature. Also, a temperature inclination a2, representing transmissivity change with respect to temperature change in the partial reflection film 32, is smaller than a temperature inclination a1, representing transmissivity change with respect to temperature change in the wavelength filter 50 (a1>a2). The temperature inclination a2 is the more moderate.

The above described temperature characteristic may be converted into the wavelength characteristic that has been described in detail in the first embodiment, in order to design the wavelength filter 50 and the partial reflection film 32.

FIG. 9 shows the temperature characteristic of Po and Pm in the case where a wavelength filter having the temperature characteristic shown in FIG. 8 is used. The axis of ordinate represents the light quantity (mW) of Po and Pm, whereas the axis of abscissas represents the temperature (° C.) thereof. As illustrated, constant Po and Pm can be obtained if the current is nearly constant, regardless of the temperature.

As described above, the present embodiment allows reduction of temperature variation in the light outputted from the CAN 100 (the light transmitted through the wavelength filter 50), because the above described wavelength filter 50 and the partial reflection film 32 are disposed on the light path of light outputted from the light emitting element 10. The embodiment also allows monitoring of such light that has been transmitted twice through the wavelength filter 50, thereby allowing a feed back control (APC) based on such monitoring. In other words, light can be monitored accurately even if the light has been transmitted twice through the wavelength filter 500.

Naturally, the light outputted from the light emitting element 10 can be further improved in uniformity in the present embodiment, as well, through feed back control (APC) performed by the monitoring light receiving element 20, as described in the second embodiment. Also, the operating temperature limit of the optical module increases.

The optical modules according to the first through the third embodiments described above can be used in an optical communications device. Use of the above described optical modules permits realization of an optical communications device in which temperature-caused variation in the light outputted from a light emitting element are reduced. It also realizes an optical communications device having a wider operating temperature limit. Thus, the device characteristics can be improved through use of the above optical modules.

In the first through third embodiments, the VCSEL has been given as one example of a light emitting element, but the light emitting element according to the invention is not restricted to the above example. Also, the CAN package has been taken as one example of packaging structure in the above described embodiments, but other packaging structures (materials) including ceramic sealing may be employed as well. The same applies to the construction materials of the connector.

Whereas the wavelength filter 50 is disposed on the inner surface (the surface facing the light emitting element 10) of the glass plate 22 in the above described first through third embodiments, the wavelength filter 50 may also be disposed on the outer surface of the glass plate 22.

In addition, in the first through third embodiments, a wavelength filter has been designed in such a way that the driving current (monitoring current) becomes constant. However, it is not always necessary to aim at achieving a condition where the driving current becomes constant. A certain range can be set for the driving current in designing a wavelength filter because compensation can be provided by the feed back control. In this way, target characteristics can be adjusted in the designing of a wavelength filter if various conditions are taken into account.

For example, in a high speed use, the operating speed deteriorates in higher and lower temperature regions. Therefore, the driving current can also be set so as to grow in higher and lower temperature regions. There is a value of current for each degree of temperature, which value allows light to be emitted most efficiently. Therefore, if such value of current can be used to drive an optical module, the transmission characteristic will be further improved.

Namely, a wavelength filter may be designed in such a manner that light outputted from a CAN package, Po, Pm, and the like, become constant in the case where a target driving current curve is used to drive an optical module. The above described embodiments are characterized by the fact that they permit temperature variation in the driving current to be freely controlled through designing of the wavelength filter.

As has been stated, the present invention is not restricted to the contents of the embodiments described above but may be implemented in a variety of modified ways so far as the modifications do not deviate from the scope and spirit of the invention. For instance, the examples given with specific numerical values in the above embodiments are only exemplified and do not limit the scope of application of the invention. In addition, the various structures so far illustrated by the

What is claimed is:

1. An optical module comprising:
   a light source;
   a variable transmissivity member that is disposed in a light path of light emitted from the light source with a spacing of a first distance from the light source, the variable transmissivity member having transmissivity that increases as temperature rises;
   a partial reflection member that is disposed on the light path of the light emitted from the light source with a spacing of a second distance from the light source, the second distance being larger than the first distance, the partial reflection member reflecting a first light component and transmitting a second light component of light that has been transmitted through the variable transmissivity member;
   a light quantity monitor that is disposed in a light path of the first light component; and
   an optical fiber that receives the second light component, the variable transmissivity member being disposed so as that the light path of the light emitted and the light path of the first light component pass through, and the light quantity monitor detecting quantity of the first light component,
   wherein a first temperature inclination representing transmissivity variation with respect to temperature variation in the partial reflection member is smaller than a second temperature inclination representing transmissivity variation with respect to temperature variation in the variable transmissivity member.

2. The optical module according to claim 1, wherein a wavelength of the light emitted increases as temperature increases.

3. The optical module according to claim 2, wherein the light source is a vertical cavity surface emitting laser.

4. The optical module according to claim 1, wherein the transmissivity of the variable transmissivity member varies with variation in a wavelength of incident light.

5. The optical module according to claim 4, wherein the transmissivity of the variable transmissivity member increases as the wavelength of the incident light increases.

6. The optical module according to claim 1, wherein transmissivity of the partial reflection member is larger than transmissivity of the variable transmissivity member.

7. An optical communications device comprising the optical module according to claim 1.

* * * * *